(12) United States Patent
Messinger et al.

(10) Patent No.: US 10,419,285 B2
(45) Date of Patent: Sep. 17, 2019

(54) CONFIGURATION MANAGEMENT DEVICE, CONFIGURATION INTERFACE DEVICE AND METHOD FOR VENDOR-INDEPENDENT NETWORK DEVICE CONFIGURATION

(71) Applicant: ABB TECHNOLOGY AG, Zürich (CH)

(72) Inventors: Christian Messinger, Hirschberg a.d. Bergstraße (DE); Philipp Vorst, Mannheim (DE); Georg Gutermuth, Heidelberg (DE); Wolfgang Mahnke, Hettenleidelheim (DE)

(73) Assignee: ABB Schweiz AG, Baden (CH)

( * ) Notice: Subject to any disclaimer, the term of this patent is extended or adjusted under 35 U.S.C. 154(b) by 777 days.

(21) Appl. No.: 14/594,809

(22) Filed: Jan. 12, 2015

(65) Prior Publication Data
US 2015/0127792 A1    May 7, 2015

Related U.S. Application Data

(63) Continuation of application No. PCT/EP2012/064268, filed on Jul. 20, 2012.

(51) Int. Cl.
*H04L 12/24* (2006.01)
(52) U.S. Cl.
CPC ........ *H04L 41/0813* (2013.01); *H04L 41/022* (2013.01); *H04L 41/0843* (2013.01)
(58) Field of Classification Search
CPC .................................................. H04L 41/0813
See application file for complete search history.

(56) References Cited

U.S. PATENT DOCUMENTS

| | | | |
|---|---|---|---|
| 6,349,306 B1 | 2/2002 | Malik et al. | |
| 6,760,761 B1 | 7/2004 | Sciacca | |
| 6,766,364 B2 | 7/2004 | Moyer et al. | |
| 2002/0178380 A1 | 11/2002 | Wolf et al. | |
| 2003/0135596 A1 | 7/2003 | Moyer et al. | |
| 2006/0242690 A1* | 10/2006 | Wolf | H04L 41/0213 726/6 |
| 2010/0205281 A1* | 8/2010 | Porter | H04L 41/12 709/220 |

FOREIGN PATENT DOCUMENTS

EP        1 468 371 B1    10/2011
WO    WO 2007/053113 A1    5/2007

OTHER PUBLICATIONS

International Search Report (PCT/ISA/210) dated Mar. 28, 2013, by the European Patent Office as the International Searching Authority for International Application No. PCT/EP2012/064268.

\* cited by examiner

*Primary Examiner* — Suraj M Joshi
(74) *Attorney, Agent, or Firm* — Barnes & Thornburg LLP

(57) ABSTRACT

A configuration management device for vendor-independent network device configuration includes a network interface unit for communicating with network devices over a communications network and a data storage unit. The network interface unit can include a unified device network interface and a device-specific driver unit, where the unified device network interface can: retrieve a device profile; to identify a network device which belongs to a network device type corresponding to the device profile; retrieve information on a device-specific configuration protocol to be used during configuration of the network device; and download values for the vendor-independent configuration parameters to the network device.

20 Claims, 3 Drawing Sheets

CONFIGURATION MANAGEMENT DEVICE, CONFIGURATION INTERFACE DEVICE AND METHOD FOR VENDOR-INDEPENDENT NETWORK DEVICE CONFIGURATION

RELATED APPLICATIONS

This application claims priority as a continuation application under 35 U.S.C. § 120 to PCT/EP2012/064268, filed as an International Application on Jul. 20, 2012, designating the U.S., the entire content of which is hereby incorporated by reference in its entirety.

FIELD

The disclosure relates to a configuration management device, a configuration interface device and a method for vendor-independent network device configuration, where the configuration management device can include a network interface unit for communicating with network devices over a communications network and a data storage unit.

BACKGROUND INFORMATION

In today's industries, network communication becomes more and more an essential part, as all electronic devices installed in a plant or factory or belonging to a distribution network can be interconnected with each other, if not directly then across network switches or I/O devices. The term electronic equipment can include every electronic device which has a communication interface, be it a digital or analogue bus interface, be it wire-bound or wireless, and it includes everything from the devices of a central control room over dedicated communication equipment such as switches, routers and I/O devices to control devices and field devices of a distributed control system. As a result, the communications network or networks of a modern industrial facility may be of considerable size and may contain a considerable number of network nodes. The network nodes may originate from different vendors, where each vendor provides a specific tool to configure and maintain their network equipment. However, the owner of the industrial facility can prefer to be independent of any specific vendor. Therefore, there is the need for efficient ways to implement and handle an industrial communications network in an industrial facility in a vendor-independent way are desired.

In EP 1 468 371 B1, a solution is described for configuring a home or office network to enable a new application or service, such as web server hosting, multi-player gaming, MP3 file sharing, video and voice conferencing etc. First, a service template is obtained from a plurality of service templates, where the service template provides vendor-neutral end-to-end requirements for enabling the particular service within the network. Then, the obtained service template is used to invoke a configuration generator that generates vendor-neutral device-configuration settings for the device types that a network can comprise. Next, after a configuration validator module has validated the network for the requested service, an adaptor module translates the vendor-neutral device-configuration settings to vendor-specific device-configuration settings and communicates these settings to the particular devices within the network.

In WO 2007/053113 a system for implementing and managing a vendor neutral network system is disclosed, which includes a template generator for generating a plurality of templates, including network equipment templates describing existing network equipment and newly selected network equipment which is not yet in existence, physical network design templates describing the connection and arrangement of the network equipment with details on cabling and connector types, and logical network design templates describing information on logical setup of the network. The system can include a configuration generator for automatically configuring the network equipment based on the plurality of templates. How the automatic configuration is performed, is, however, not described.

From U.S. Pat. No. 6,349,306 B1, a method and apparatus for configuration management in communications networks is known, where, in an already existing and fully configured network, configuration settings can be changed by using a database. In the database, each network device is represented by a so called model, where each model is assigned to a so called model type. Each model type is associated with attributes which are common to all models belonging to the respective model type, so that a model type can be understood as being analogous to a "class" in object-oriented terminology. In order to load new configuration settings to a group of network devices, first a template is created by selecting a specific model type. The attributes of the model type are filled automatically by screening the database and retrieving the attribute values of the network devices belonging to this specific model type, thereby generating a configuration record. Then, the attribute values in the configuration record may be modified, and the modified configuration record be loaded to one or more of the models in the database belonging to the specific model type. Once a configuration record is loaded to a model, a network management system will modify the parameters of the network device to conform to the configuration data in the model.

SUMMARY

A configuration management device is disclosed for vendor-independent network device configuration, comprising: a network interface unit for communicating with network devices over a communications network; and a data storage unit, arranged to store at least one device profile containing a name and vendor-independent configuration parameters of a corresponding network device type, wherein the network device type is defined to provide a pre-defined functionality within the communications network, the network interface unit including unified device network interface and at least one device-specific driver unit, wherein the unified device network interface is arranged and configured to: retrieve the at least one device profile from the data storage unit; identify at least one network device which belongs to the network device type corresponding to the at least one device profile; retrieve information on a device-specific configuration protocol to be used during configuration of the at least one network device; and download values for vendor-independent configuration parameters to the at least one network device via a corresponding of the at least one device-specific driver unit which is arranged to apply the device-specific configuration protocol.

A configuration interface device is also disclosed, comprising: a unified device network interface for communicating over a communications network with a configuration management device which is configured to store data for vendor independent network device configuration; and a device-specific driver unit for communicating over the communications network with a network device, wherein: the unified device network interface is arranged and configured to receive from the configuration management device a name of at least one device profile applicable to the network device, the at least one device profile containing vendor-independent configuration parameters of a corresponding network device type, and the network device type being defined to provide a pre-defined functionality within the communications network; the unified device network interface is arranged and configured to receive from the configuration management device values for the vendor-independent configuration parameters belonging to the at least one device profile and to provide them to the device-specific driver unit; and the device-specific driver unit is configured to retrieve the values for the vendor-independent configuration parameters, and to download them to the network device using a device-specific configuration protocol.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
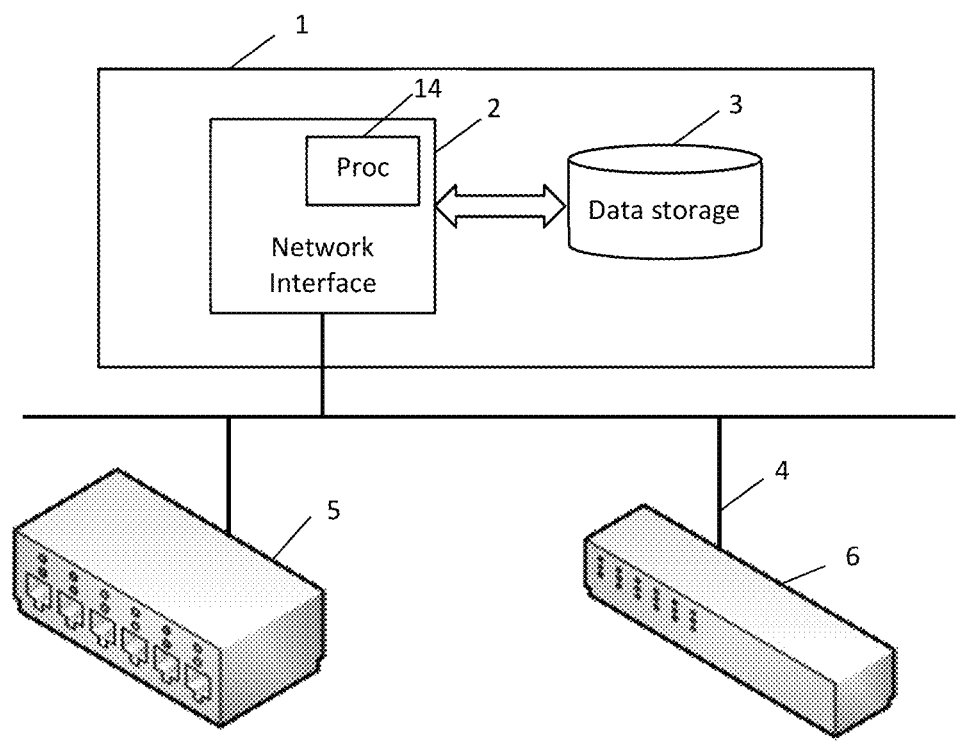
FIG. 1 shows an exemplary configuration management device in connection with two network devices.

Solutions are disclosed herein for vendor-independent network device configurations which support the planning and designing of the network.

In an exemplary configuration management device according to the disclosure, the data storage unit is arranged and configured to store at least one device profile containing vendor-independent configuration parameters of a corresponding network device type, where the network device type is defined to provide a pre-defined functionality within the communications network. The network interface unit of the configuration management device can include a unified device network interface and at least one device-specific driver unit. The unified device network interface is arranged and configured to retrieve the at least one device profile from the data storage unit, to identify at least one network device which belongs to the network device type corresponding to the at least one device profile, to retrieve an information on a device-specific configuration protocol to be used during configuration of the at least one network device, and to download values for the vendor-independent configuration parameters to the at least one network device via a corresponding of the at least one device-specific driver units which is arranged to apply the device-specific configuration protocol.

The downloading functionality of the configuration management device could as well be implemented in an external device called configuration interface device. The configuration interface device can include a unified device network interface for communicating over the communications network with a configuration management device which is adapted (i.e., configured) to store data for vendor independent network device configuration, and a device-specific driver unit for communicating over the communications network with a network device. The unified device network interface of the configuration interface device can be arranged and configured to receive from the configuration management device the name of at least one device profile applicable to the network device, where a device profile contains vendor-independent configuration parameters of a corresponding network device type, with the network device type being defined to provide a pre-defined functionality within the communications network.

The unified device network interface can be further arranged and configured to receive, from the configuration management device, values for the vendor-independent configuration parameters belonging to the at least one device profiles and to provide the vendor-independent configuration parameters to the device-specific driver unit. The device-specific driver unit of the configuration interface device is arranged and configured to retrieve the values for the vendor-independent configuration parameters and to download them to the network device using a device-specific configuration protocol.

An exemplary method for vendor-independent network device configuration according to the disclosure can use the above described exemplary configuration management device and/or configuration interface device and can include: storing at least one device profile containing vendor-independent configuration parameters of a corresponding network device type, where the network device type is defined to provide a pre-defined functionality within a communications network, retrieving the at least one device profile, identifying at least one network device of the communications network which belongs to the network device type corresponding to the at least one device profile, retrieving an information on a device-specific configuration protocol to be used during configuration of the at least one network device, and downloading values for the vendor-independent configuration parameters to the at least one network device using the device-specific configuration protocol.

Accordingly, embodiments of the disclosure can assign to each vendor-specific network device at least one device profile, where each device profile corresponds to a pre-defined network device type which is defined to provide a pre-defined functionality within the communications network. The device profile can contain vendor-independent configuration parameters for configuring the corresponding network device type. The device profile can contain a name for the device profile and preferably a number of ports for the corresponding network device type, where the ports are the network ports for the specific communications network. Examples for possible network device types are "switch", "router", "VLAN-switch", "operations PC", "field controller", "I/O board" or "printer". Vendor-independent configuration parameters may be for example DHCP settings (Dynamic Host Configuration Protocol), IP-address settings (Internet Protocol address), time synchronization settings, as well as information on whether a port is enabled or disabled, which VLAN ID is assigned to a specific port and further user management configuration of the network device.

After the values of the vendor-independent configuration parameters are set, the configuration of those network devices which are of the corresponding network device type is then performed by downloading these values from the configuration management device either directly or via the configuration interface device to the specific network devices. Therefore, the configuration management device and the configuration interface device, respectively, can be equipped with a unified device network interface which is adapted to communicate with the data storage unit of the configuration management device to receive and transmit any kind of data, and for example receive the vendor-independent configuration parameters. As the name already indicates, the unified device network interface can be a vendor-independent interface. It cooperates with a device-specific driver unit which is also part of the configuration management device and the configuration interface device, respectively, where the device-specific driver unit uses a device-specific configuration protocol to download and implement the vendor-independent configuration parameters in the network device, either directly or after a translation into device-specific parameters. The cooperation between unified device network interface and device-specific driver unit can be implemented as direct communication or as access to the same data storage unit in the configuration management device or configuration interface device, respectively.

The suggested usage of device profiles with vendor-independent parameters allows for a simplified and better controllable configuration of the communications network with just one configuration management device and just one configuration software tool instead of having to use various vendor-specific configuration devices and tools. As a result, the one configuration management device has the full control over and the history of all configuration settings, which enables the creation of a consistent "as-built-documentation". The engineer who installs and commissions the communications network can focus on the correct parameterization of the network instead of trying to memorize how each of the various configuration devices or tools work. The configuration of the network can accordingly be concentrated in one single hand, which increases the security of the communications network as unauthorized access to the network is easier detectable and as the possibility for unauthorized access via third-party tools is eliminated.

An exemplary advantage of the disclosure is the possibility to use the pre-defined network device types for the designing and planning of the communications network. In the beginning, only a rough network structure needs to be known. For the designing of the network with the help of a computer tool, device placeholders which are assigned to one of the pre-defined network device types and which are therefore vendor-independent may be used. The result is a virtual network. Then, for each of the device placeholders, vendor-independent parameters of the corresponding device profile or of a corresponding combination of device profiles are set in order to interconnect the device placeholders so that the virtual network is filled with life. A combination of device profiles includes (e.g., consists of) a basic device profile, for example relating to the basic functionality of a "switch", and at least one specialized device profile, such as "security switch" or "VLAN switch", where the specialized device profile is used to further specify or concretize the basic device profile. The vendor-independent parameters may be set either by a human network designer via a user interface or by a tool for automatic network configuration, running for example in the configuration management device, or by a combination of both. Afterwards, for each of the device placeholders, a concrete physical network device to be purchased from a specific vendor can be chosen, where the concrete network device needs to fulfill the device profile. This may again be done by a user or by a computer-implemented tool, running for example in the configuration management device, where the computer-implemented tool may for example filter a catalog of network devices based on the requirements defined by the device profiles. The output is an electronic order list, on the basis of which the network devices may then be ordered, physically installed and finally configured as described above. Hence, it becomes possible to plan the network before the actual hardware decision is made, which simplifies the planning phase considerably.

In this way, not only the configuration but the engineering of the communications network as a heterogeneous system is simplified due to the integration of all specified steps in one and the same computer device, here the configuration management device. Hence, a communications network can be engineered faster and with less effort and costs, compared to the using of various vendor-dependent tools. A further exemplary advantage is that an electronic representation of the whole communications network becomes available in the configuration management device in vendor-independent form which simplifies also the handling of any amendments or changes to the network.

The data storage unit in the configuration management device as well as a possibly implemented data storage unit in the configuration interface device can be a volatile or non-volatile memory.

The device-specific configuration protocol used in the configuration management device or configuration interface device, respectively, for implementing the vendor-independent parameters can be based for example on SNMP (Simple Network Management Protocol), Netconf (Network Configuration Protocol), TFTP (Trivial File Transfer Protocol), a command line interface via for instance SSH (Secure Shell) or Telnet (Telecommunication Network), a Web browser interface via for instance HTTP (Hypertext Transfer Protocol) or a Web service as defined by the World Wide Web Consortium (W3C). These protocols are device-specific in the sense that within one and the same communications network, a first network device may communicate via a first of these configuration protocols and a second network device via a second of these configuration protocols. It is the vendor who decides which configuration protocol to apply. In addition, not only the network devices but also the usage of the device-specific protocols within the network devices is vendor-specific, in the sense that different vendors usually have different approaches to actually apply the configuration functions of one and the same protocol. For two different network devices communicating via the same configuration protocol, vendor-independency would only be achieved if the parameters of the configuration functions would be the same for both network devices (i.e., if the parameters of one and the same configuration function would be of the same data type and would have the same position within the function).

In an exemplary embodiment of the configuration management device, the unified device network interface is arranged to identify the at least one network device by receiving via the corresponding device-specific driver unit from the at least one network device or be retrieving from the data storage unit the name of at least one device profile which is applicable to the at least one network device. In other words, the configuration management device needs to know which network devices are to be configured (i.e., which network devices belong to the network device type, the vendor-independent parameters of which are to be downloaded and whether the respective network device or devices possess the unified device network interface). This information can, for example, be obtained by the configuration management device either directly from the data storage unit or by scanning the communications network and receiving from the connected network devices at least the names of the device profiles which they support, respectively. The scanning may be an iterative scanning as perhaps not the entire communications network can be reached without accessing and/or configuring some of the network devices first which then establish a connection to further network devices which are located further away from the configuration management device.

The same concept is applicable with respect to the information on the device-specific protocol used by each of the network devices, respectively. Accordingly, the unified device network interface may be arranged and configured to retrieve an information on the device-specific configuration protocol from the data storage unit or by receiving it from the at least one network device via the corresponding device-specific driver unit.

In a specific exemplary embodiment, the unified device network interface may be arranged and configured to download the values for the vendor-independent configuration parameters to multiple network devices simultaneously. For example, in redundant networks, at least two network devices may be of the same network device type with exactly the same vendor-independent parameters. These redundant network devices may then be configured in one go.

As already described, the network device profiles may be used to design and plan the communications network. In order to support this functionality, the unified device network interface may be arranged and configured to automatically extract device profiles from an existing communications network (i.e., to retrieve via the corresponding device-specific driver unit from at least one network device a device description containing device parameters). The configuration management device, for example, a processing unit of the configuration management device, is then arranged and configured to extract the device parameters from the device description as vendor-independent configuration parameters. In case that the device description was retrieved from at least two network devices, the configuration management device is configured to extract the vendor-independent configuration parameters from an intersection or a union of the device parameters of the at least two network devices or from a matching of strings of names of the device parameters.

The configuration management device may further be arranged and configured to automatically generate a unified device network interface from a generic configuration driver and a device description of at least one network device, before actually starting the configuration process of the communications network (i.e., the configuration management device may be arranged and configured to generate its own tool for the vendor-independent configuration).

The already described data representation of the communications network in vendor-independent form may be stored in the data storage unit of the configuration management device as an interconnection of generic network devices, where the generic network devices are each related to one or a combination of device profiles and where in a combination of device profiles a basic device profile, for example relating to the basic functionality of a "switch", is supplemented by a further specification or concretion of this basic device profile by adding one or more specialized device profiles, such as "security switch" or "VLAN switch". From this data representation, the unified device network interface of the configuration management device may retrieve the above described information on which network devices are to be configured during the next download of vendor-independent parameters and which device-specific protocols they use.

Further, the unified device network interface may be arranged and configured to retrieve via the corresponding device-specific driver unit from at least one network device a currently implemented set of parameters and to compare the set of parameters with the corresponding vendor-independent configuration parameters of the corresponding generic network device in the representation of the communications network. This means that the planned configuration is compared with the implemented configuration (i.e., an as-planned versus as-built analysis takes place).

Even further, the configuration management device may be arranged and configured to retrieve the representation of the communications network from the data storage unit, to analyze it with respect to possible design errors in the network, such as non-reachability of a network device, presence of connected but un-configured ports of a network device or missing redundancy of a connection between two network devices. The output of this analysis may then be used to correct the design errors and/or to re-design the communications network.

Another exemplary advantage of the disclosure is the possibility to use the centrally available vendor-independent configuration information for fast re-loading of this information to a network device, which is of particular interest when the hardware of the network device was replaced. Accordingly, the unified device network interface of the configuration management device can be arranged and configured to recognize a newly installed network device which replaces a previously installed network device, where the newly installed network device may come from a different vendor or may be of not exactly the same but only a similar instrument type. In such an embodiment, it is important that the newly installed network device supports the same device profile as was used in the previously installed network device in order to be able to fulfill the same function within the network. The unified device network interface can be arranged and configured to download the same values for the vendor-independent configuration parameters to the newly installed network device which were implemented in the previously installed network device. The result is a plug-and-play solution for the communications network.

As already indicated, the described extensions of the functionality of the unified device network interface of the configuration management device may be implemented in the unified device network interface alone or in connection with a further processing unit, where the further processing unit is contained in the configuration management device as well.

In cases where not all configuration parameters required by a network device may be modeled and assigned to a network device type, the device-specific driver unit of the configuration management device or configuration interface device, respectively, may be arranged to retrieve values for device-specific parameters which are not covered by the vendor-independent configuration parameters and to download to and implement the values in the network device. These values may be retrieved from a data storage unit of the configuration management device or configuration interface device, respectively, via a user interface, or from an external network device, such as in the case of the configuration interface device from the configuration management device.

In FIG. 1, an exemplary configuration management device 1 is shown which includes a data storage unit 3 and a network interface unit 2 with an integrated processing unit 14. The network interface unit 2 is connected to a communications network 4. A first network device 5 and a second network device 6 are connected to the same communications network 4.

Each of the network devices 5, 6 can be represented by at least one device placeholder, which is a representation of a generic network device 20 having assigned a vendor-independent device profile. Accordingly, each device placeholder represents one particular network device type providing a particular functionality with the communications network 4. For one and the same physical network device, more than one device placeholders may be used if its hardware so allows. In other words, one and the same network device may be configured in different ways so that it performs different functions within the network.

Figure 2:
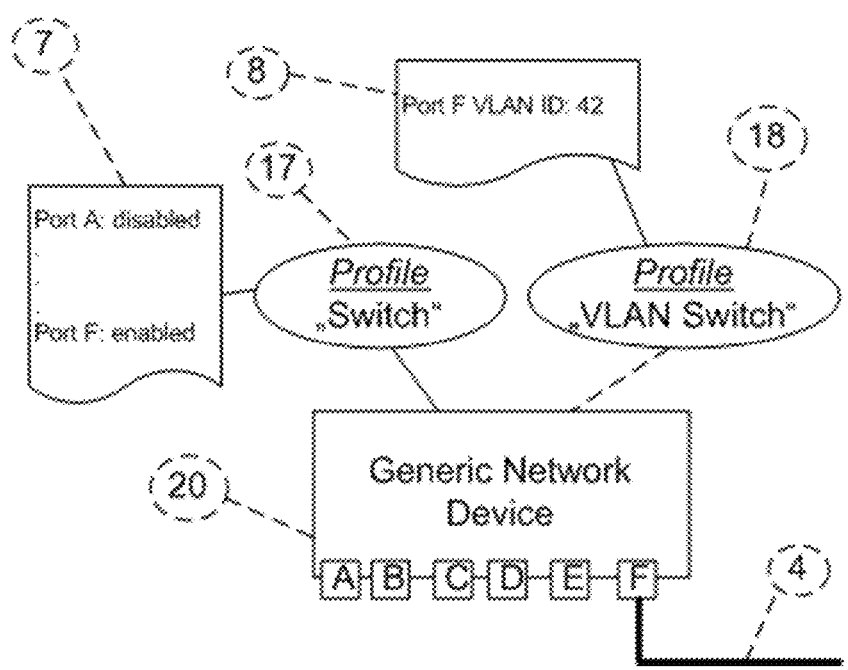
FIG. 2 shows an illustration of an exemplary device placeholder.

FIG. 2 shows an example of two possible device placeholders applicable to one and the same physical network device which is of the kind "managed switch" and which has six network ports A to F. Two device profiles 17 and 18 are available, where each device profile contains a name, here "Switch" and "VLAN Switch", and a set of vendor-independent parameters 7 or 8 corresponding to the network device type which provides the respective functionality of a switch or a VLAN (virtual local area network) switch, respectively. Accordingly, a physical network device which would fulfill the requirements of both device profiles 17 and 18 is a device which can be operated in different ways, either as a plain network switch interconnecting computers or other processing units via communications network 4, or as a VLAN switch grouping together the six network ports A to F into at least two subgroups so that each subgroup belongs to a separated sub-network of the communications network 4. Hence, the first device placeholder is defined by generic device 20 in connection with the first device profile 17, and the second device placeholder results from an assignment of second device profile 18 to generic device 20. In the example of FIG. 2, the values of the vendor-independent parameters 7 of the first device profile 17 are set so that only the sixth port F is enabled to be connected to communications network 4 while all other ports A to E are disabled. The values of the vendor-independent parameters 8 of the second device profile 18 are set to assign the enabled port F to a specific VLAN ID (VLAN identifier). Accordingly, a vendor-independent configuration of either a switch or a VLAN switch can be prepared without needing to know from which vendor the managed switch is going to be purchased.

Figure 3:
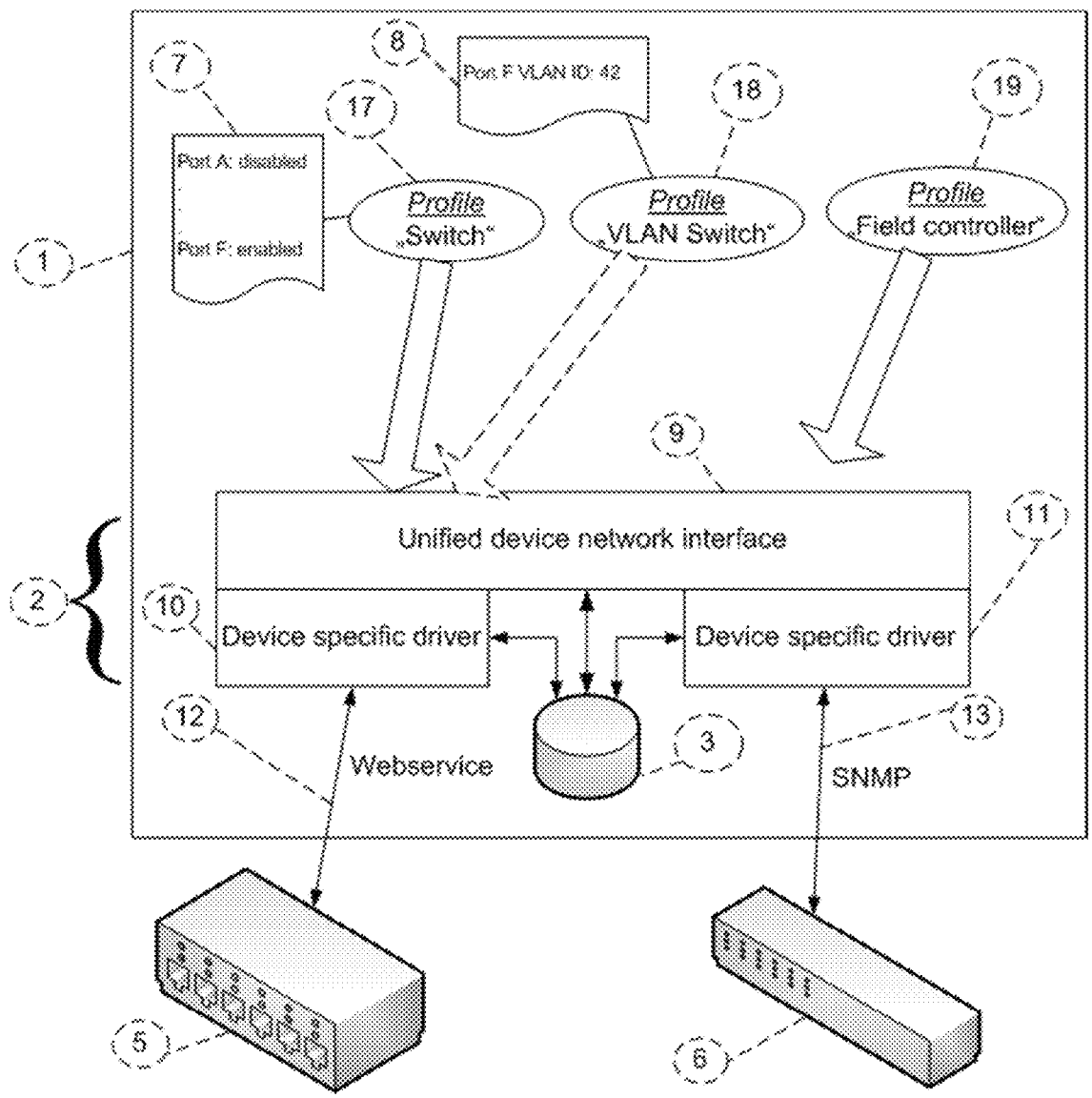
FIG. 3 shows a more detailed view of the exemplary configuration management device of FIG. 1 in connection with the vendor-independent configuration process of the two network devices.

With the help of FIG. 3, it is now explained how network devices 5 and 6 can be configured in a vendor-independent way based on the already described device profiles. Three vendor-independent device profiles 17, 18 and 19 are stored in data storage unit 3 of the configuration management device 1. The first device profile 17 belongs to a network switch, the second device profile 18 to a VLAN switch, and the third device profile 19 to a field controller.

The network interface unit 2 of configuration management device 1 includes a unified device network interface 9 and a first device specific driver unit 10 and a second device specific driver unit 11. The unified device network interface 9 retrieves from data storage unit 3 information on which of the network devices connected to communications network 4 is to be configured and with what device profiles. In the example of FIG. 3, first network device 5 is to be configured as a "Switch", followed by second network device 6 to be configured as a "Field controller". Before the first configuration can take place, it has to be ensured or the unified device network interface 9 has to verify that the first network device 5 actually belongs to the network device type corresponding to the respective device profile intended for downloading. Accordingly, the identification of the network device to which a particular device profile can and should be downloaded is performed by unified device network interface 2 either indirectly by retrieving corresponding information from data storage unit 3 where this information is stored after a verification of the above named prerequisites, or directly by scanning the communications network 4.

Another piece of information which is used by network interface 2 for the downloading process is the information on a device-specific configuration protocol 12 to be used during configuration of the first network device 5. This information can again be retrieved from data storage unit 3 or by requesting it from first network device 5. As an exemplary alternative, the unified device network interface 9 may recognize the device-specific configuration protocol 12 by probing the first network device 5 with a kind of trial-and-error method. The device-specific configuration protocol 12 of the first network device 5 can be a Web service based protocol, which is then assigned to be used by the first device specific driver unit 10. The device-specific configuration protocol 13 of the second network device 6 can be SNMP, which is assigned to be used by the second device-specific driver unit 11.

Once all the necessary information is known to unified device network interface 9, the values for the vendor-independent configuration parameters 7 of device profile 17 are downloaded by the unified device network interface 9 to the first network device 5 via the first device-specific driver unit 10 using the device-specific configuration protocol 12 (i.e., the Web service based protocol). During the downloading, a translation of the vendor-independent configuration parameters 7 may be performed and remaining device-specific parameters may be added by device-specific driver unit 10 if necessary. As a result, the first network device 5 is configured as a network switch.

Afterwards, the same process is performed by the unified device network interface 9 of configuration management device 1 in collaboration with the second device specific driver unit 12 in order to configure the second network device 6 as a field controller so that it becomes able to communicate as planned within communications network 4. The device-specific configuration protocol 13 used during the configuration is SNMP.

Figure 4:
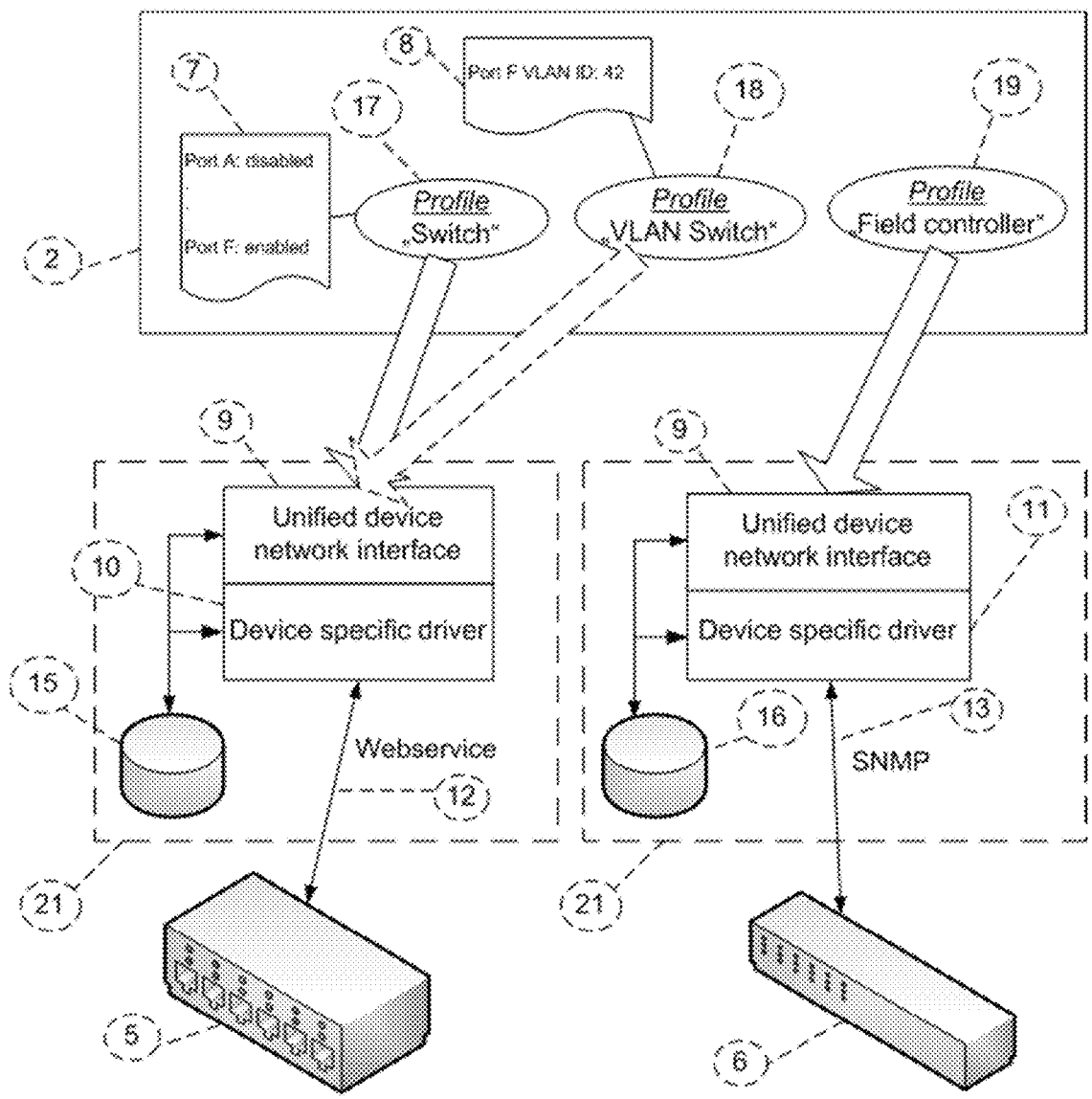
FIG. 4 shows a view of FIG. 3 with exemplary configuration interface devices.

FIG. 4 differs from FIG. 3 only in that the unified device network interface 9, a device specific driver unit 10, 11 and a data storage unit 15, 16 are implemented in a configuration interface device 21. For each of the network device 5, 6, a corresponding configuration interface device 21 is located within the communications network 4 between the configuration management device and the corresponding network device 5, 6. At first, each configuration interface device 21 is a generic device. Once the device-specific protocol 12, 13 of the corresponding network device 5, 6 is identified and assigned to the internal device-specific driver unit 10, 11, the configuration interface device 21 is individualized and becomes able to configure the corresponding network device 5, 6. The identification of the device-specific protocol 12, 13 can be performed by storing this information either in the data storage unit 15, 16 of the respective configuration interface device 21, or in the data storage unit 3 of the configuration management device 1 which communicates with the configuration interface devices 21 via network interface 2, or in a data storage unit of the network devices 5, 6, from where the information is retrieved in each case by the unified device network interface 9.

The downloading process of the vendor-independent configuration parameters of the device profiles 17, 19 is the same as already described, with the only difference that the unified device network interfaces 9 of the configuration interface devices 21 receive the names of the device profiles to be downloaded and the values for their vendor-independent configuration parameters from the configuration management device 1.

In the foregoing description, all devices connected to the communications network are described as physical hardware. However, as there is a trend towards virtualizing parts of a network infrastructure, it is to be understood that the configuration management device, the configuration interface devices as well as the network devices may as well be implemented as virtual devices in a reduced number of physical devices.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A configuration management device for vendor-independent network device configuration, the device comprising:
    a network interface for communicating with network devices over a communications network, the network interface including a unified device network interface and one or more device-specific drivers; and
    a data storage arranged to store at least one pre-existing device profile containing a name and vendor-independent configuration parameters of a corresponding network device type, wherein the network device type is defined to provide a pre-defined functionality within the communications network;
    wherein the unified device network interface is configured to:
        retrieve the at least one device profile from the data storage;
        identify at least one network device which belongs to the network device type corresponding to the at least one device profile;
        retrieve information on a device-specific configuration protocol to be used during configuration of the at least one network device; and
        download values for vendor-independent configuration parameters to the at least one network device via a corresponding device-specific driver of the one or more device-specific drivers, the device-specific driver being arranged to apply the device-specific configuration protocol; and
    wherein the at least one pre-existing device profile is adapted to automatically configure the communications network before the device-specific driver communicates over the communications network with the at least one network device.

2. A configuration management device according to claim 1, wherein the unified device network interface is configured to identify the at least one network device by receiving via a corresponding device-specific driver from the at least one network device, or by retrieving from the data storage, a name of at least one device profile which is applicable to the at least one network device.

3. A configuration management device according to claim 1, wherein the unified device network interface is configured to retrieve information on the device-specific configuration protocol from the data storage or to receive information on the device-specific configuration protocol from at least one network device via a corresponding device-specific driver.

4. A configuration management device according to claim 1, wherein the unified device network interface is configured to download values for vendor-independent configuration parameters to multiple network devices simultaneously.

5. A configuration management device according to claim 1, wherein the unified device network interface is configured to retrieve, via a corresponding device-specific driver from at least one network device, a device description containing device parameters and corresponding values, wherein the configuration management device is configured to extract, from the device description, values for the vendor-independent configuration parameters and, when a device description is retrieved from at least two network devices, the configuration management device is configured to extract the vendor-independent configuration parameters from an intersection or a union of device parameters of the at least two network devices or from a matching of strings of names of the device parameters.

6. A configuration management device according to claim 1, wherein the configuration management device is configured to generate the unified device network interface from a generic configuration driver and a device description of at least one network device.

7. A configuration management device according to claim 1, wherein the data storage stores a representation of the communications network as a virtual network of generic network devices, wherein the generic network devices are each related to a device profile or a combination of device profiles.

8. A configuration management device according to claim 7, wherein the unified device network interface is configured to retrieve, via a corresponding device-specific driver from at least one network device, a currently implemented set of parameters and to compare the set of parameters with corresponding vendor-independent configuration parameters of a corresponding generic network device in the representation of the communications network.

9. A configuration management device according to claim 7, wherein the configuration management device is configured to retrieve the representation of the communications network from the data storage and to analyze the representation with respect to possible design errors in the network, which possible design errors include at least one of: non-reachability of a network device, presence of connected but un-configured ports of a network device, or missing redundancy of a connection between two network devices.

10. A configuration management device according to claim 7, wherein the configuration management device is configured to identify at least one vendor-specific network device from a pre-defined catalog of vendor-specific network devices which supports the device profile or the combination of device profiles of one of the generic network devices belonging to the representation of the communications network, and to enter the at least one vendor-specific network device into an order list.

11. A configuration management device according to claim 1, wherein the unified device network interface is configured to recognize a newly installed network device which replaces a previously installed network device, and to download values for the vendor-independent configuration parameters to the newly installed network device which are the same as those implemented in a previously installed network device.

12. A configuration management device according to claim 1, wherein the device-specific driver is configured to retrieve values for device-specific parameters which are not covered by the vendor-independent configuration parameters, and to download the values to the network device.

13. A configuration interface device, comprising:
a unified device network interface for communicating over a communications network with a configuration management device which is configured to store data for vendor-independent network device configuration and to automatically configure the communications network; and
a device-specific driver for communicating over the communications network with a network device, wherein:
the unified device network interface is configured to receive from the configuration management device a name of at least one pre-existing device profile applicable to the network device, the at least one pre-existing device profile containing vendor-independent configuration parameters of a corresponding network device type, and the network device type being defined to provide a pre-defined functionality within the communications network;
the unified device network interface is configured to receive from the configuration management device values for the vendor-independent configuration parameters belonging to the at least one device profile and to provide them to the device-specific driver; and
the device-specific driver is configured to retrieve the values for the vendor-independent configuration parameters, and to download them to the network device using a device-specific configuration protocol;
wherein the at least one pre-existing device profile is adapted to perform the automatic configuration of the communications network before the device-specific driver communicates over the communications network with the network device.

14. A configuration interface device according to claim 13, wherein the device-specific driver is configured to retrieve values for device-specific parameters which are not covered by the vendor-independent configuration parameters, and to download the values to the network device.

15. A method for vendor-independent network device configuration using a configuration management device according to claim 1, the method comprising:
storing at least one device profile containing a name and vendor-independent configuration parameters of a corresponding network device type, wherein the network device type is defined to provide a pre-defined functionality within a communications network;
retrieving the at least one device profile;
identifying at least one network device of the communications network which belongs to the network device type corresponding to the at least one device profile; and
retrieving information on a device-specific configuration protocol to be used during configuration of the at least one network device, and downloading values for the vendor-independent configuration parameters to the at least one network device using the device-specific configuration protocol.

16. A method for vendor-independent network device configuration using a configuration interface device according to claim 13, the method comprising:
storing at least one device profile containing a name and vendor-independent configuration parameters of a corresponding network device type, wherein the network device type is defined to provide a pre-defined functionality within a communications network;
retrieving the at least one device profile;
identifying at least one network device of the communications network which belongs to the network device type corresponding to the at least one device profile;
retrieving an information on a device-specific configuration protocol to be used during configuration of the at least one network device, and downloading values for the vendor-independent configuration parameters to the at least one network device using the device-specific configuration protocol.

17. A configuration management device according to claim 2, wherein the unified device network interface is configured to retrieve information on the device-specific configuration protocol from the data storage or to receive information on the device-specific configuration protocol from at least one network device via a corresponding device-specific driver.

18. A configuration management device according to claim 17, wherein the unified device network interface is configured to download values for vendor-independent configuration parameters to multiple network devices simultaneously.

19. A configuration management device according to claim 18, wherein the unified device network interface is configured to retrieve, via a corresponding device-specific driver from at least one network device, a device description containing device parameters and corresponding values, wherein the configuration management device is configured to extract, from the device description, values for the vendor-independent configuration parameters and, when a device description is retrieved from at least two network devices, the configuration management device is configured to extract the vendor-independent configuration parameters from an intersection or a union of device parameters of the at least two network devices or from a matching of strings of names of the device parameters.

20. A configuration management device according to claim 19, wherein the configuration management device is configured to generate the unified device network interface from a generic configuration driver and a device description of at least one network device.

* * * * *